United States Patent [19]
Robertson

[11] 3,900,169
[45] Aug. 19, 1975

[54] FILM CARTRIDGE

[75] Inventor: Jeffrey C. Robertson, Rochester, N.Y.

[73] Assignee: Eastman Kodak Company, Rochester, N.Y.

[22] Filed: Apr. 30, 1974

[21] Appl. No.: 465,454

[52] U.S. Cl. ............................... 242/194; 242/197
[51] Int. Cl.² ..................... G03B 1/04; G11B 15/32
[58] Field of Search ........................... 242/194–199, 242/71.2, 84.8, 55.19 A; 352/72

[56] References Cited
UNITED STATES PATENTS

| | | | |
|---|---|---|---|
| 2,175,538 | 10/1939 | Morsbach et al. | 242/71.2 |
| 2,893,656 | 7/1959 | Carlson | 242/84.8 |
| 2,951,654 | 9/1960 | Steelman | 242/55.19 A |
| 3,804,351 | 4/1974 | Kaneko et al. | 242/199 |

*Primary Examiner*—Leonard D. Christian
*Attorney, Agent, or Firm*—T. H. Close

[57] ABSTRACT

A film cartridge loaded with a roll of motion picture film having a magnetic stripe on one surface of the film is subject to shaking or impacts during handling of the cartridge which result in stepping or displacement of some convolutions of the film in a direction parallel to the axis of the film roll, especially when the film has first clocksprung in a radial direction. When stepping occurs, friction between the displaced convolution and the adjacent convolutions of the film prevents return of the stepped convolution to its original position. Consequently, when the film is to be pulled from the supply roll during operation of a camera in which the cartridge is positioned, the stepped convolutions can contact a wall of the cartridge and produce a frictional force that opposes normal unwinding of the film. This can result in improper film advance.

In order to avoid this undesirable stepping of the film, the cartridge is provided with a film restraining member, which is urged against the side of the roll of film by a resilient means, thereby squeezing the roll of film between the film restraining member and one wall of the cartridge. Means is also provided for releasing the film restraining member in response to tension being applied to the film to allow normal unwinding of the film.

5 Claims, 6 Drawing Figures

FILM CARTRIDGE

BACKGROUND OF THE INVENTION

1. Field of the Invention

This invention relates to film cartridges of the type used in motion picture cameras and the like and, more particularly, to a film cartridge adapted to receive a roll of motion picture film having a magnetic sound stripe which projects from one surface of the film.

2. Description of the Prior Art

Commonly assigned U.S. Pat. No. 3,208,686 entitled Film Cartridge, issued Sept. 28, 1965 in the name of E. A. Edwards et al., discloses a "super 8" film cartridge for motion picture cameras or the like. In the cartridge, a coreless roll of motion picture film is positioned around (but not attached to) a stationary post in a supply chamber of the cartridge. The film is withdrawn from the chamber along a film path past an exposure aperture and is then wound onto a take-up core in a take-up chamber of the cartridge. The supply and take-up chambers are in substantially parallel planes and the supply roll and the take-up roll are substantially coaxial.

Since the film supply roll in such a cartridge is coreless, it is subject to clockspringing (i.e., successive convolutions of the film roll may be displaced radially outwardly relative to the central axis of the roll) due to the tendency of the coiled unsecured film supply roll to unwind. When such cartridges are loaded with film containing a magnetic stripe for recording sound, the magnetic stripe typically is placed along the edge of one surface of the film. A balance stripe is typically provided on the other edge of the same surface of the film. Both the recording stripe and the balance stripe project from the surface of the film.

Because the walls defining the supply chamber in the cartridge are spaced apart by a distance somewhat greater than the width of the film roll, the various film convolutions can step in a random manner, by a distance which allows a stepped convolution to contact one wall of the supply chamber. This results in excessive frictional contact by the supply roll of film with at least one wall of the film supply chamber, and may result in unsatisfactory advance of film in a camera and subsequent unsteady projection of the exposed film. The problem is especially pronounced when the film has clocksprung as a result of handling during packaging, shipping, etc.

Attempts to force the stepped convolutions to return to their original position by surface formations on the inner surface of the walls of the cartridge chamber generally are not satisfactory due to the frictional contact between the stepped convolutions of the film and the adjacent convolutions.

One approach to the solution of this problem is disclosed in the commonly assigned copending U.S. patent application Ser. No. 336,142, entitled Film Cartridge, filed in the name of S. H. Miller et al., on Feb. 26, 1973 now U.S. Pat. No. 3,858,968. The Miller et al. application discloses a device for bowing a side or wall of the film cartridge adjacent the side of the film roll, thereby expanding the supply chamber along the axis of the film roll to allow more clearance for the roll to rotate. This solution does not cure the problem of stepping, but does relieve the undesirable results if stepping occurs.

SUMMARY OF THE INVENTION

It is an object of the present invention to provide a film cartridge which prevents stepping of film in a supply roll of film contained in the cartridge.

Another object of the invention is to avoid clockspringing of the film during shipping or handling and thereby minimize the liklihood that the film will become stepped.

A further object of the invention is to control stepping of film even after a film cartridge is loaded into a camera.

A still further object of the invention is to provide a film cartridge for motion picture film or the like wherein the restraints against clockspringing or stepping are removed when film is being removed from the supply roll and are restored when film motion ceases.

In accordance with the invention, in a film cartridge having a supply chamber for receiving a roll of convoluted film with a projecting stripe on one surface of the film, a film roll restraining member is provided which extends radially along the edges of the convolutions of the roll, preferably from the innermost convolution to the outermost convolution. The film restraining member is movable between a first position wherein it squeezes the roll between the restraining member and one wall of the cartridge, thereby preventing stepping and clockspringing of the roll, and a second position wherein the roll is free to rotate. Resilient means are provided in contact with the film restraining member for urging the film restraining member toward its first position. Means coupled with the film restraining member and responsive to tension being applied to the film are provided for moving the film restraining member toward its second position.

BRIEF DESCRIPTION OF THE DRAWINGS

The description of the preferred embodiment refers to the accompanying drawings, in which.

DESCRIPTION OF THE PREFERRED EMBODIMENT

Because photographic apparatus is well known, the following description will be directed in particular to elements forming part of, or cooperating directly with the present invention, apparatus not specifically shown or described being understood to be selectable from that known in the art.

Figure 2:
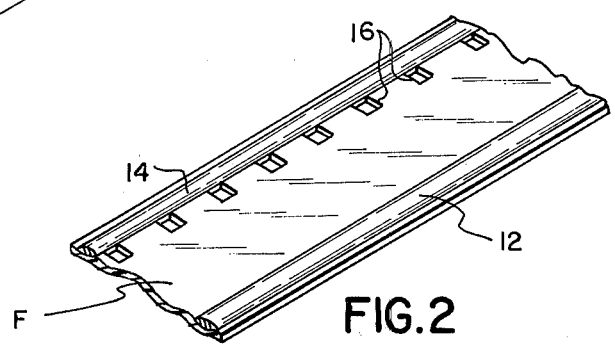
FIG. 2 is an enlarged perspective view of a portion of a film strip of the type loaded in the cartridge shown in FIG. 1.

Reference is now made to the drawings where a film cartridge according to the present invention is generally designated 10 and is adapted to be loaded with film F. As shown in FIG. 2, the film F may be a film strip having a stripe 12 of magnetic recording material along one edge of one surface of the film and a balance stripe 14 along the other edge of the same surface of the film. The balance stripe is located adjacent to a plurality of perforations 16 in the film strip.

Figure 3:
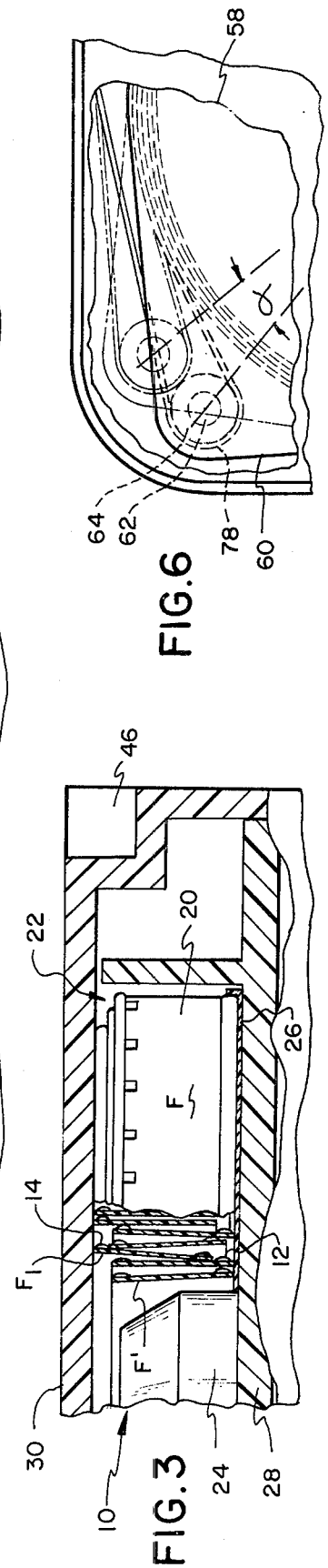
FIG. 3 is an enlarged fragmentary view of a portion of the supply side of the film cartridge showing certain convolutions of the film stepped in a manner which is considered undesirable.

As noted earlier, sound film of the type shown in FIG. 2, when loaded in a super 8 film cartridge of the kind disclosed in the Edwards et al patent, tends to clockspring. This allows the convolutions of film to step when the cartridge is subjected to shaking or impacts incident to normal handling. The stepped condition that can result is illustrated in FIG. 3 which shows a coreless roll 20 of film F located in a supply chamber 22 of the film cartridge. The inner end F' of the film is unattached and loosely positioned around a stationary supply post 24. The film convolution designated F1 has become stepped and the lower portion thereof frictionally contacts the sound stripe 12 of the inwardly adjacent film convolution. The balance stripe 14 of F1 has hung up on the outwardly adjacent convolution.

FIG. 3 also shows the film roll 20 resting on an anti-friction disk 26 which may be of the type disclosed in the commonly assigned U.S. Pat. No. 3,208,685 issued Sept. 28, 1965 in the names of E. A. Edwards and A. J. Tucker and entitled Anti-Friction Disk for Strip Material Cartridge. Such an anti-friction disk can be used in combination with the present invention and is designated 26 in FIGS. 4 and 5. The anti-friction disk enables the film roll to rotate relatively freely with respect to the inner wall or partition 28 of the supply chamber. However, the stepped convolution of film F1 shown in FIG. 3 contacting the inner surface of a flexible cover 30 of the supply chamber produces a frictional force when the supply roll is rotated (as is necessary during advancement of film in a camera). This force increases the load required for proper advancement of film and, since this load might exceed that which the camera is able to move, can result in improper advance of film. This produces unsteady images in projected film.

Referring again to FIG. 1, it is seen that film in the supply chamber is unwound in a counterclockwise direction (as viewed in FIG. 1) and advanced past an exposure aperture 34 in the cartridge by a film advance mechanism (such as a claw) for exposure to scene light in a camera. The film is then advanced through a sound aperture 32 in the cartridge for recording of sound onto the film. The film is finally fed into a take-up chamber 36 (partially shown in FIGS. 4 and 5) located below wall 28 in a plane parallel to the plane of the supply chamber.

Figure 1:
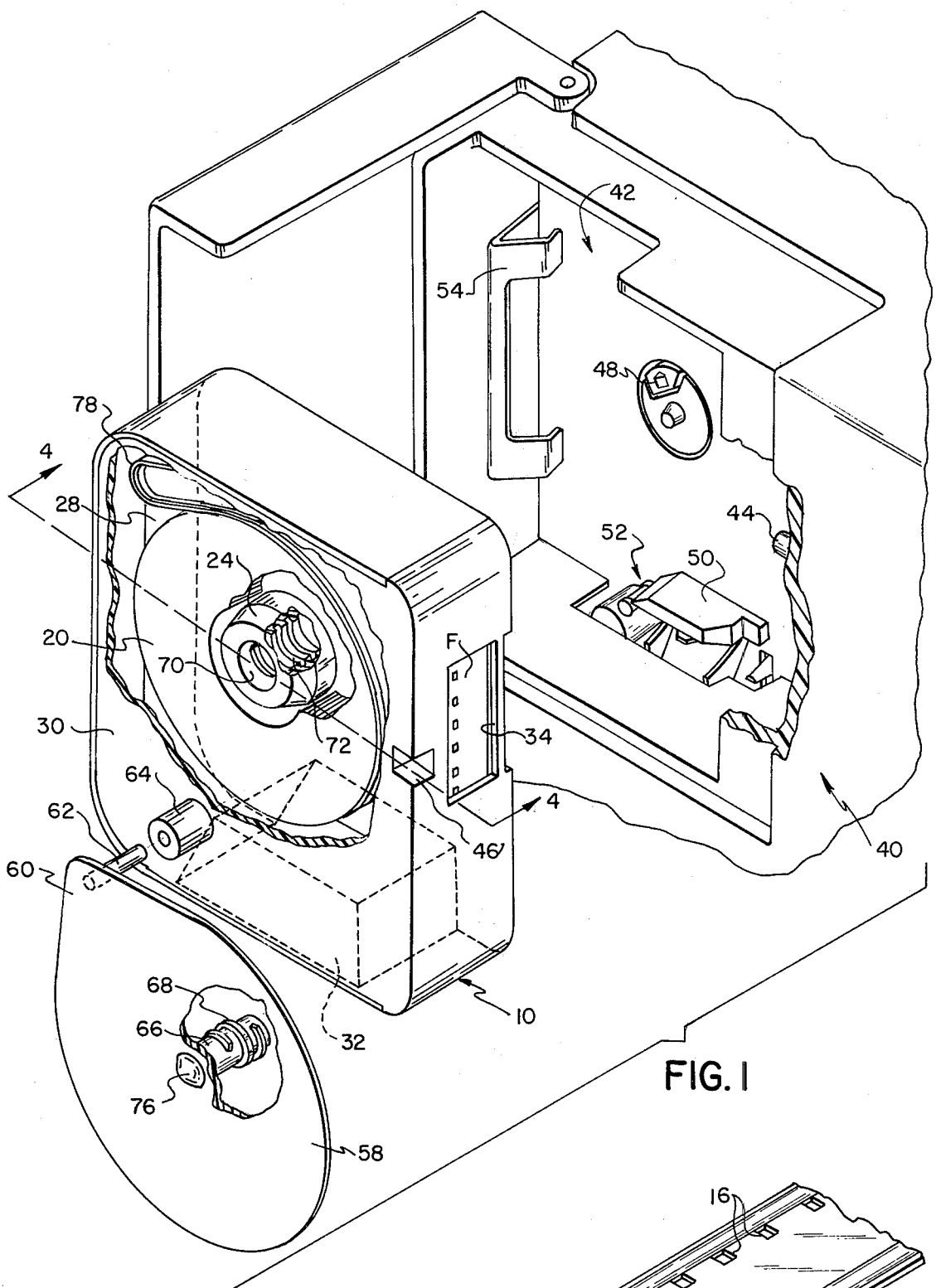
FIG. 1 is an exploded view, partially broken away, illustrating both a cartridge constructed in accordance with the present invention and a portion of a motion picture camera or the like adapted to receive the cartridge.

The cartridge 10 is adapted to be positioned in a motion picture camera or the like, a portion of which is generally designated 40 in FIG. 1. The camera has a cartridge receiving chamber 42 and a cartridge locating pin 44 on one wall of the chamber. A locating notch 46 in the cartridge receives the pin to locate the cartridge with respect to the chamber. A drive member 48 projects through the back wall of the cartridge chamber and engages a conventional take-up core (not shown) within the cartridge. The drive member 48 rotates the take-up core in a take-up direction during operation of the camera. A shroud 50 and certain elements of sound apparatus generally designated 52 are at least partially received in the sound aperture 32 of the cartridge. Elements 52 can record sound on the magnetic stripe 12 of the film simultaneous with exposure of film through exposure aperture 34. A spring means 54 in the camera urges the cartridge toward the locating pin when the cartridge is in the chamber.

In accordance with the present invention the cartridge is provided with a clamping device to prevent clockspringing and telescoping of a film roll in the cartridge by exerting pressure on the side of the film supply roll. The pressure is released when tension is applied to the film and restored when film tension ceases. No external actuating mechanism is required other than the normal film advance mechanism.

More specifically, in accordance with the present invention the clamping device comprises a restraining member, such as the flat substantially circular disk 58 shown in FIG. 1. The disk has an extension 60 which eccentrically supports a pin 62 on which is mounted a roller 64.

The disk also has a centralized fixed shaft 66 terminating in a configuration which when received in a socket of complimentary configuration causes linear displacement of the shaft along its longitudinal axis in response to rotation of the shaft about its longitudinal axis.

This configuration is shown as a helix 68, but could alternatively take the form of an oblique truncation of the shaft or any similar structure that would yield the same result. The shaft is rotatably mounted in the supply chamber in a complimentary-shaped socket 70 provided in stationary post 24. The socket terminates in a helical configuration 72 complimenting that on the shaft. The disk is forced against the side of the film roll by pressure from suitable resilient means. In the preferred embodiment the disk is held in place by pressure of the flexible cartridge cover 30 acting against a bearing button 76 provided on the surface of the disk and which maintains a small clearance between the cover and the disk.

The coreless roll of film 20 is loaded into the cartridge between the disk 58 and the inner wall 28 of the cartridge. The strand of film 78 departing from the roll is passed around the roller 64 thus forming a loop 78 and reversing the direction of the film before it is threaded past the exposure aperture, the sound aperture and then into the take-up chamber.

Figure 4:
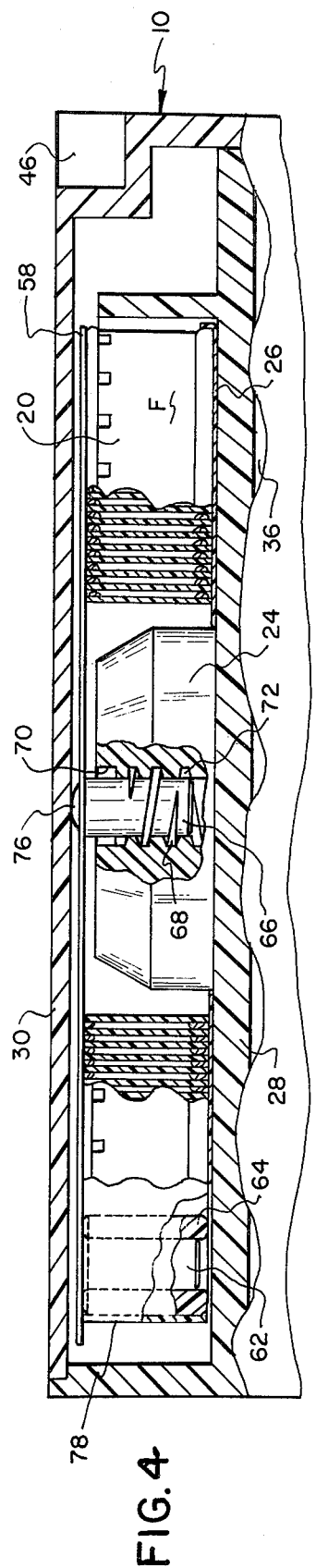
FIG. 4 is a fragmentary cross-sectional view of the cartridge shown in FIG. 1, FIG. 4 being taken along line 4—4 of FIG. 1 and illustrating the cartridge when substantially no tensioin is applied to the film.

The device functions in the following manner. As shown in FIG. 4, when substantially no tension is applied to the film to pull it past the exposure aperture (i.e., when the cartridge is out of the camera or when it is in the camera and the camera is not running) the pressure of the cartridge cover on the bearing button 76 holds the disk 58 firmly against the side edge of the film roll facing cover 30, thus preventing film from stepping. The friction between the disk and the film roll also keeps the roll from clockspringing.

Figure 5:
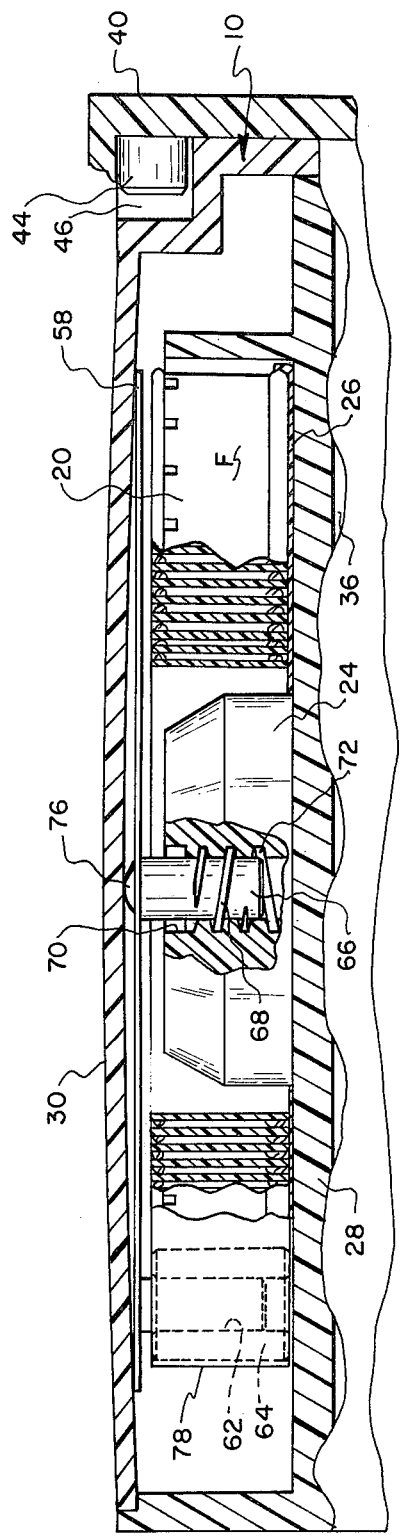
FIG. 5 is a view similar to FIG. 4 but illustrating the cartridge when tension is being applied to the film for unwinding the supply roll.
Figure 6:
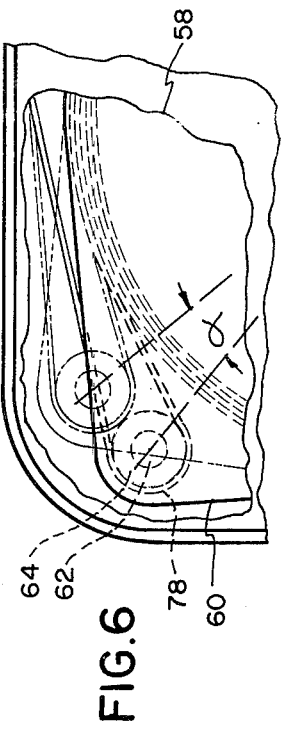
FIG. 6 is a partially-broken away, fragmentary view illustrating the upper left hand corner portion of the cartridge shown in FIG. 1.

The roller 64 on the outlying eccentric pin and the helix 68 on the central shaft cooperate to form a means for moving the disk axially away from the film roll. When a claw or other film drive member applies tension to the film to advance it, the loop of film 78 exerts a force on roller 64. This force is transmitted through pin 62 to the disk, tending to rotate the disk in a clockwise direction. As shown in FIG. 6 the disk is rotated through some small angle alpha from the position shown in solid lines to the position indicated in phantom. The central shaft rotates with the disk by the same angular amount, thereby unscrewing the shaft from its socket. As illustrated in FIG. 5, this moves the shaft axially out of its socket against the pressure of the cover 30, thereby bowing the cover slightly and releasing the pressure exerted by the disk against the film roll.

It can be seen that, depending upon the relationship between the distance of the pin 62 from the center of the disk and the pitch and diameter of the helix, a mechanical advantage can be achieved whereby a small amount of tension applied to the film will be effective to relieve a relatively large amount of pressure on the side of the film roll. When tension on the departing strand of film is released the disk is free to rotate and return to its original position under the influence of pressure from the cartridge cover. Thus the clamping pressure on the side of the film roll is restored.

I claim:

1. In a cartridge having walls defining a chamber for a supply of strip material, the supply being in a roll formed of a plurality of adjacent convolutions of the strip wherein opposite edges of the strip lie substantially in two parallel planes, the improvement comprising:
   a restraining member disposed in the chamber substantially parallel to the planes in which the edges of the strip lie, said member being adjacent one of the planes and being movable between (1) a first position wherein the supply is held firmly between said member and one wall of the supply chamber with a force sufficient to hold adjacent convolutions of the strip against relative motion and to prevent rotation of the supply and (2) a second position wherein the supply is released to permit the supply to rotate;
   resilient means operatively coupled to said restraining member for urging said member toward its first position; and
   means coupled with said restraining member and responsive to tension being applied to the strip for moving said restraining member toward its second position.

2. In a cartridge having walls defining a supply chamber for a roll of film or the like which can be unrolled and withdrawn from the supply chamber by application of tension to the film, the roll being formed of a plurality of substantially circular adjacent convolutions of film or the like and having an innermost and an outermost convolution, and the roll having a tendency to become stepped in an axial direction, the improvement comprising:
   a film restraining member disposed within the supply chamber and extending radially along the edges of the convolutions of the roll from the innermost to the outermost convolution, said film restraining member being movable between (1) a first position wherein the roll is squeezed between said member and one wall of the chamber with sufficient force to prevent axial stepping of the film and rotation of the roll about its axis, and (2) a second position wherein the roll is free to rotate about its axis;
   means operatively coupled with said film restraining member for urging said member toward its first position; and
   means coupled with said film restraining member and responsive to tension being applied to the film for moving said member toward its second position.

3. In a film cartridge of the kind having a supply chamber for a roll of motion picture film or the like wherein (1) the supply chamber has (a) a flexible wall and (b) a central post, about which the film roll is positioned, the post being attached to a wall of the supply chamber opposite the flexible wall and being shorter than the width of the film, and wherein (2) the film can be unrolled and withdrawn from the supply chamber by application of tension to the film, a film clamping device comprising:
   a disk of substantially the same diameter as the film roll, said disk being positioned in the supply chamber between the film roll and the flexible wall of the chamber, said disk having (1) a portion extending beyond the edge of the film roll and (2) a centrally located raised bearing portion on the side of said disk engaging the flexible wall whereby said disk is forced against the film roll by pressure of the flexible wall against the bearing portion;
   a pin, slightly shorter than the width of the film, mounted upright on the extended portion of said disk on the side of said disk facing the film roll;
   a cylindrical roller having an inner diameter slightly greater than the diameter of said pin and mounted for rotational motion thereon; and
   a shaft, approximately equal in length to the width of the film, having first and second end portions, the first end portion of said shaft being attached to the center of said disk, the second end portion of said shaft terminating in a helical configuration, the central post of the supply chamber having a socket of complimentary helical configuration in which to receive said shaft,
   whereby, when the film roll is disposed in the supply chamber such that a strand of film departing from the roll first passes in a loop around said roller, and when tension is applied to the departing film strand, said disk is rotated by the film strand through a small angle thereby unscrewing said shaft from its socket, bowing the flexible wall, and moving said disk away from the film roll to facilitate withdrawal of film.

4. In a film cartridge of the kind having a supply chamber for a roll of motion picture film or the like wherein (1) the supply chamber has a pair of parallel side walls, one wall of said pair being flexible and the other wall having attached thereto a central post about which the film roll is positioned, said post being shorter than the width of the film, and wherein (2) the film can be unrolled and withdrawn from the supply chamber by application of tension to the film, a film clamping device comprising:
   a disk of substantially the same diameter as the film roll, said disk being positioned coaxially with the film roll and between the film roll and the flexible wall of the chamber, said disk also having (1) a portion extending beyond the edge of the film roll and (2) a centrally located raised bearing portion on the side of said disk facing the flexible wall, whereby said disk is forced against the film roll by pressure of the flexible wall against the bearing portion to trap the film roll between said disk and the opposite wall of the chamber thereby restraining stepping and clockspringing of the film roll;

a pin, slightly shorter than the width of the film, mounted upright on the extended portion of said disk on the side of said disk facing the film roll;

a cylindrical roller substantially the same length as said pin and having an inner diameter slightly greater than the diameter of said pin and mounted for rotational motion thereon; and a shaft attached perpendicularly to the center of said disk, the distal end portion of said shaft defining a helical configuration, the central post of the supply chamber having a socket of complimentary helical configuration helical configuration in which to receive said shaft, whereby, when the film roll is disposed in the supply chamber such that a strand of film departing from the roll first passes in a loop around said roller, and when tension is applied to the departing film strand, said disk is rotated through a small angle thereby unscrewing said shaft from its socket, bowing the flexible wall, and moving said disk away from the film roll to facilitate withdrawal of film.

5. In a cartridge having walls defining a chamber for a roll of film or the like having a tendency to become stepped in an axial direction, the improvement comprising:

a member positioned at least partially within the chamber and between the film roll and one wall of the chamber-defining walls, and means associated with said member for effecting movement of said member away from the film roll and toward said one wall, said means for effecting movement of said member comprises a film guide roller occupied to said member and located along a path for film leaving the film chamber so that a force applied to film in the path effects rotational movement of the member, and means responsive to rotational movement of the member for moving the member away from the film roll and toward said one wall.

* * * * *

PO-1050
(5/69)

UNITED STATES PATENT OFFICE
CERTIFICATE OF CORRECTION

Patent No. 3,900,169          Dated August 19, 1975

Inventor(s) Jeffrey C. Robertson

It is certified that error appears in the above-identified patent and that said Letters Patent are hereby corrected as shown below:

Column 7, line 12, "helical configuration" should be deleted.

Column 8, lines 12 and 13, "occupied" should be --coupled--.

Signed and Sealed this twenty-fifth Day of November 1975

[SEAL]

Attest:

RUTH C. MASON
Attesting Officer

C. MARSHALL DANN
Commissioner of Patents and Trademarks